(12) United States Patent
Mirtorabi et al.

(10) Patent No.: US 7,865,615 B2
(45) Date of Patent: Jan. 4, 2011

(54) MAINTAINING IGP TRANSPARENCY OF VPN ROUTES WHEN BGP IS USED AS A PE-CE PROTOCOL

(75) Inventors: Sina Mirtorabi, Santa Clara, CA (US); Peter Psenak, Ivanka pri Dunaji (SK); Mukhtiar Shaikh, San Jose, CA (US); Eric C. Rosen, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 11/430,205

(22) Filed: May 8, 2006

(65) Prior Publication Data

US 2007/0260746 A1   Nov. 8, 2007

(51) Int. Cl.
G06F 15/173 (2006.01)
(52) U.S. Cl. .................................... 709/242
(58) Field of Classification Search .................. 709/238
See application file for complete search history.

(56) References Cited

U.S. PATENT DOCUMENTS

| | | |
|---|---|---|
| 6,339,595 B1 | 1/2002 | Rekhter et al. |
| 6,463,061 B1 | 10/2002 | Rekhter et al. |
| 6,473,421 B1 | 10/2002 | Tappan |
| 6,526,056 B1 | 2/2003 | Rekhter et al. |
| 6,603,756 B1 | 8/2003 | Tappan |
| 6,970,464 B2 | 11/2005 | Xu et al. |
| 7,420,958 B1 * | 9/2008 | Marques ..................... 370/351 |
| 2002/0089962 A1 * | 7/2002 | Lagoutte ..................... 370/338 |

OTHER PUBLICATIONS

Request for Comments (RFC) 2328, entitled OSPF Version 2, dated Apr. 1998 by J. Moy.*

Rosen, Eric C., et al., Network Working Group Internet Draft, entitled OSPF as the Provider/Customer Edge Protocol for BGP/MPLS IP VPNs, Feb. 2006, pp. 1-25.
Sangli, S., Network Working Group Request for Comments 4360, entitled BGP Extended Communities Attribute, Feb. 2006, pp. 1-12.
Tanenbaum, Andrew S., Computer Networks, Fourth Edition, Section 1.4.2, entitled The TCP/IP Reference Model, Prentice Hall, New Jersey, 2003, pp. 41-44.
Rekhter, Y., et al., Network Working Group Request for Comments 1771, entitled A Border Gateway Protocol (BGP-4), Mar. 1995, pp. 1-54.
Moy, J., Network Working Group Request for Comments 2328, entitled OSPF Version 2, Apr. 1998, pp. 1-183.
Rosen, E., Network Working Group Request for Comments 2547, entitled BGP/MPLS VPNs, Mar. 1999, pp. 1-24.

* cited by examiner

Primary Examiner—Joseph E Avellino
Assistant Examiner—Dung B Huynh
(74) Attorney, Agent, or Firm—Cesari and McKenna, LLP (57) ABSTRACT

A technique maintains Interior Gateway Protocol (IGP) transparency of Virtual Private Network (VPN) routes when Border Gateway Protocol (BGP) is used as a Provider Edge Device (PE) to Customer Edge Device (CE) protocol in a computer network. According to the novel technique, a first CE generates a BGP advertisement to advertise one or more VPN routes of its customer network, the BGP advertisement having one or more transitive IGP attributes for the advertised routes. The first CE sends the BGP advertisement to a first PE, which then propagates the BGP advertisement among devices of a provider network maintaining the transitive IGP attributes. A second PE sends the BGP advertisement to a second CE, along with the transitive IGP attributes. Upon receiving the BGP advertisement, the second CE converts the BGP advertisement and transitive IGP attributes into corresponding IGP advertisements. The second CE may then propagate the IGP advertisements into its customer network as either internal VPN routes or as external routes accordingly.

17 Claims, 5 Drawing Sheets

MAINTAINING IGP TRANSPARENCY OF VPN ROUTES WHEN BGP IS USED AS A PE-CE PROTOCOL

BACKGROUND OF THE INVENTION

1. Field of the Invention

The present invention relates to computer networks and more particularly to maintaining Interior Gateway Protocol (IGP) transparency of Virtual Private Network (VPN) routes when Border Gateway Protocol (BGP) is used as a Provider Edge Device (PE) to Customer Edge Device (CE) protocol in a computer network.

2. Background Information

A computer network is a geographically distributed collection of interconnected subnetworks, such as local area networks (LAN), that transport data between network nodes. As used herein, a network node is any device adapted to send and/or receive data in the computer network. Thus, in the context of this disclosure, the terms "node" and "device" may be used interchangeably. The network topology is defined by an arrangement of network nodes that communicate with one another, typically through one or more intermediate network nodes, such as routers and switches. In addition to intra-network communications between network nodes located in the same network, data also may be exchanged between nodes located in different networks. To that end, an "edge device" located at the logical outer-bound of a first computer network may be adapted to send and receive data with an edge device situated in a neighboring (i.e., adjacent) network. Inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its destination. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Although IPv4 is prevalent in most networks today, IP Version 6 (IPv6) has been introduced to increase the length of an IP address to 128 bits (16 bytes), thereby increasing the number of available IP addresses. Typically, a network or subnetwork is allocated a predetermined set of IP addresses which may be assigned to network nodes situated within that network or subnetwork. Here, a subnetwork is a subset of a larger computer network, and thus network nodes in the subnetwork may be configured to communicate with nodes located in other subnetworks.

A subnet mask may be used to select a set of contiguous high-order bits from IP addresses within a subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. As used herein, an "address prefix" is defined as the result of applying a subnet mask to a network address, such as an IP address. An address prefix therefore specifies a range of network addresses in a subnetwork, and in IPv4 a /32 address prefix corresponds to a particular network address. A "route" is defined herein as an address prefix and its associated path attributes. The path attributes generally include any information that characterizes the address prefix, and may include various protocol-specific attributes, such as conventional Border Gateway Protocol attributes.

Interior Gateway Protocols (IGP)

A computer network may contain smaller groups of one or more subnetworks which may be managed as separate autonomous systems. As used herein, an autonomous system (AS) is broadly construed as a collection of interconnected network nodes under a common administration. Often, the AS is managed by a single administrative entity, such as a company, an academic institution or a branch of government. For instance, the AS may operate as an enterprise network, a service provider or any other type of network or subnetwork. Each AS is typically assigned a unique identifier, such as a unique AS number, that identifies the AS among a plurality of ASes in a computer network.

An AS may contain one or more edge devices (or "autonomous system border routers," ASBRs), having peer connections to other edge devices located in adjacent networks or subnetworks. Thus, packets enter or exit the AS through an appropriate ASBR. The AS may be logically partitioned into a plurality of different "routing areas." Each routing area includes a designated set of network nodes that are configured to share routing and topology information. As such, the network nodes in a routing area share a consistent "view" of the network topology. Since consistent sets of intra-area, inter-area, and inter-AS routing information are usually distributed among network nodes in an AS, the nodes can calculate consistent sets of "best paths" through the AS, e.g., using conventional shortest path first (SPF) calculations or other routing computations. A calculated best path corresponds to a preferred data path for transporting data between a pair of source and destination nodes. The best path may be an intra-area, inter-area, or inter-AS data path, depending on the locations of the source and destination nodes.

Area border devices, such as area border routers (ABR), are located at the logical border of two or more routing areas. Accordingly, each ABR device participates in multiple routing areas and typically maintains a separate set of routing and topology information for each adjacent routing area in which it participates. Each network node in a routing area typically maintains its own link-state database (LSDB). The LSDB is configured to store topology information advertised with the node's routing area. Because an ABR (by definition) participates in multiple routing areas, each ABR therefore maintains a separate LSDB for each of its routing areas.

Network nodes located in the same routing area generally exchange routing information and network-topology information using an "interior gateway" routing protocol (IGP), such as a link-state protocol. An example of a conventional link-state protocol is the Open Shortest Path First (OSPF) protocol, which is described in more detail in Request for Comments (RFC) 2328, entitled *OSPF Version 2*, dated April 1998, which is publicly available through the Internet Engineering Task Force (IETF) and is hereby incorporated by reference in its entirety.

OSPF employs conventional link-state advertisements (LSA) for exchanging routing and topology information between a set of interconnected intermediate network nodes, i.e., routers and switches. In fact, different types of LSAs may be used to communicate the routing and topology information. For example, the OSPF version 2 specification (RFC 2328) defines the following types of LSAs: Router, Network, Summary, and AS-External LSAs. Router and Network LSAs are used to propagate link information within a routing area. Specifically, Router LSAs advertise router-interface links (i.e., links connected to routers) and their associated cost values, whereas Network LSAs advertise network-interface links (i.e., links connected to subnetworks) and their associated cost values within the routing area.

Summary and AS-External LSAs are used to disseminate routing information between routing areas. The Summary LSA is typically generated by an ABR and is used to advertise intra-AS ("internal") routes between routing areas. First, the ABR receives various LSAs that are advertised in a first routing area. The ABR "summarizes" the advertised routes by aggregating routes where possible. Next, the ABR stores the summarized routes in a Summary LSA, which it then advertises in a second routing area. In this way, nodes in the second area are made aware of routes in the first routing area that can be reached through the ABR. An AS-External LSA stores a list of reachable inter-AS ("external") routes, i.e., located outside of the AS. The AS-External LSA is typically generated by an ASBR and is propagated throughout the AS to identify which external routes can be reached through the advertising ASBR. Unlike Summary LSAs, routes stored in an AS-External LSA are generally not aggregated.

PE-CE Network Topology

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

Network nodes belonging to the same VPN may be situated in different subnetworks, or "customer sites." Each customer site may participate in one or more different VPNs, although most often each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another.

The customer sites typically communicate with one another through a service provider network ("provider network"). The provider network is an AS that functions as a backbone network through which VPN information may be exchanged between customer sites. The provider network may include both provider edge devices (PEs) which function as ASBRs at the logical outer edge of the provider network, as well as provider (P) devices situated within the interior ("core") of the provider network. Accordingly, each customer site contains at least one customer edge device (CE) coupled to a PE in the provider network. The customer site may be multi-homed to the provider network, i.e., wherein one or more of the customer's CEs is coupled to a plurality of PEs. The PE-CE data links may be established over various physical media, such as conventional wire links, optical links, wireless links, etc., and may communicate data formatted using various network communication protocols including ATM, Frame Relay, Ethernet, Fibre Distributed Data Interface (FDDI), etc.

In a popular VPN deployment, provider networks often provide the customer sites with layer-3 network-based VPN services that utilize IP and/or Multi-Protocol Label Switching (MPLS) technologies. These networks are typically said to provide "MPLS/VPN" services. This widely-deployed MPLS/VPN architecture is generally described in more detail in the IETF publication RFC 2547, entitled *BGP/MPLS VPNs*, by E. Rosen et al., published March 1999, which is hereby incorporated by reference as though fully set forth herein.

Most typically, PEs and CEs are configured to exchange routing information over their respective PE-CE data links in accordance with the Border Gateway Protocol (BGP). The BGP protocol is well known and described in detail in RFC 1771 by Y. Rekhter and T. Li, entitled *A Border Gateway Protocol 4 (BGP-4)*, dated March 1995, which publication is hereby incorporated by reference as though fully set forth herein. A variation of the BGP protocol, known as internal BGP (iBGP), is often used to distribute routing and reachability information between PEs in the provider network. To implement iBGP, the PEs must be "fully meshed," such that each PE is coupled to every other PE, e.g., by way of a Transmission Control Protocol (TCP) connection. Those skilled in the art will understand that the fully-meshed PEs may be directly connected or may be otherwise coupled, e.g., by one or more conventional BGP route reflectors.

BGP-enabled PEs and CEs perform various routing functions, including transmitting and receiving BGP messages or advertisements, and rendering routing decisions based on BGP routing policies. Each BGP-enabled device maintains a local BGP routing table that lists feasible routes to reachable (i.e., accessible) network nodes and subnetworks. The BGP table also may associate one or more BGP attributes with each route that it stores. For example, a conventional BGP AS-path attribute may be associated with a BGP route so as to identify a particular AS path that may be used for reaching that route. Typically, the AS path is represented as an ordered sequence of AS numbers corresponding to which ASes must be traversed in order to reach the route's associated node or subnetwork.

Although BGP is most often executed over PE-CE data links, other protocols also may be used to exchange routing and topology information between a customer-site CE and a provider-network PE. For instance, the Internet Draft publication <draft-ietf-l3vpn-ospf-2547-05.txt>, entitled *OSPF as the Provider/Customer Edge Protocol for BGP/MPLS IP VPNs*, published November 2005 by Rosen et al., which publication is publicly available through the IETF and is hereby incorporated by reference in its entirety, describes an implementation in which OSPF is executed over a PE-CE link. In this case, the PE functions as an ABR for the customer site containing the CE, and thus the PE maintains both an OSPF LSDB containing the customer site's IGP topology information as well as a BGP table containing BGP routes that have been distributed, e.g., via iBGP, within the provider network.

One particular advantage to using IGP protocols (e.g., OSPF) as the PE-CE protocol for MPLS VPN networks is that the routing information from one customer network is kept "transparent" through the provider network into another customer network of the same IGP domain. In other words, because the PEs actively participate in the IGP sessions of the customer networks, each PE receives IGP messages advertising the VPN routes (i.e., IGP routes of a customer network) of the customer network from a CE (e.g., a first CE). Notably, in this manner, the PE is aware of the customer network's topology and possibly any metrics (e.g., cost, etc.) associated with the VPN routes. The PE (a first PE) may then propagate the VPN routes throughout the provider network, e.g., using BGP (e.g., iBGP or MP-BGP). In particular, in accordance with the above-incorporated Internet draft, entitled *OSPF as the Provider/Customer Edge Protocol for BGP/MPLS IP VPNs*, the PE may convert the IGP metrics and other topology information (domain identifiers, route types, etc.) into non-transitive extended community attributes. Once another PE (a second PE) receives the routes, the second PE determines whether it is attached to a customer network that belongs to the first CE's IGP domain. If so, the second PE converts the received BGP advertisement (e.g., and any non-transitive extended community attributes) into an IGP message for internal routes for the VPN (e.g., an OSPF Type 3 LSA) and forwards the IGP message to that CE (e.g., a second CE). Because the second CE receives an IGP message of internal routes, the second CE and subsequent nodes/routers of its customer network install the VPN routes as internal routes. The routing information from one customer network to another (e.g., of the same IGP domain) is thus kept "transparent" through the provider network, in that both customer networks view the advertised VPN routes as internal routes, regardless of the fact that the routes traverse the provider network (e.g., label switched).

Generally, however, many service providers prefer to use BGP as the PE-CE protocol, and force the customer networks to use BGP to announce their VPN routes to the PE. For instance, many service providers have better knowledge (comfort) of BGP, and BGP offers better control and/or policy over the customer's CEs. Some service provider PEs may not be able to communicate with certain IGPs, e.g., proprietary IGPs, such as the Enhanced Interior Gateway Routing Protocol (EIGRP) of Cisco Systems, Inc. (Those skilled in the art will understand that some customers would prefer to maintain privacy of their topology from the provider networks.) Also, BGP is more scalable than certain IGPs, which may require multiple IGP instances when the PE is attached to more than one CE (e.g., one IGP per customer VPN). Other reasons for using BGP as the PE-CE protocol will be understood by those skilled in the art, e.g., smaller LSDBs, BGP prefix limits, etc.

By using BGP as the PE-CE protocol, though, the transparency described above is destroyed. For instance, here the first CE will advertise its VPN routes to the first PE via a BGP advertisement, which is propagated to the second PE as mentioned above. Now, however, the second PE sends the VPN routes to the second CE as a BGP advertisement in accordance with the PE-CE protocol. As a result, the second CE converts the BGP advertisement into an IGP advertisement, and accordingly redistributes the routes into the customer network as external routes (e.g., as OSPF Type 5 LSAs), i.e., due to the conventional configuration that routes received via BGP are external routes as will be understood by those skilled in the art. The VPN routes that are actually internal to the second CE's IGP domain (i.e., and the first CE's IGP domain) are therefore improperly installed as external routes.

In addition to improperly installing internal VPN routes as external routes, any IGP attributes originally sent by the first CE to the first PE through the BGP advertisement will have been lost in the BGP transitions. For instance, certain IGP attributes may be encapsulated within a BGP advertisement. For example, those skilled in the art will understand how a multi-exit discriminator (MED) field within the BGP advertisement may be used to convey an IGP metric/cost value to the receiving node. The MED field, just as all other conventional fields currently used to convey IGP attributes, are non-transitive, in that they only enter the next AS (e.g., the provider network), but do not leave that AS (e.g., into other customer networks). As such, the second PE, when sending a BGP advertisement to the second CE (i.e., the next AS), will remove any non-transitive attributes, including any IGP attributes contained therein. Currently, no transitive attributes are available in BGP advertisements that would convey IGP attributes of a first customer network to another customer network.

There remains a need, therefore, for a technique that maintains IGP transparency of VPN routes when BGP is used as the PE-CE protocol. In particular, there remains a need to properly distinguish between internal VPN routes and external VPN routes at CEs receiving BGP advertisements. In addition, there remains a need to convey IGP attributes of those internal VPN routes of one customer network to another customer network using BGP advertisements.

SUMMARY OF THE INVENTION

The present invention is directed to a technique for maintaining Interior Gateway Protocol (IGP) transparency of Virtual Private Network (VPN) routes when Border Gateway Protocol (BGP) is used as a Provider Edge Device (PE) to Customer Edge Device (CE) protocol in a computer network. According to the novel technique, a first CE generates a BGP advertisement to advertise one or more VPN routes of its customer network, the BGP advertisement having one or more transitive IGP attributes for the advertised routes. The first CE sends the BGP advertisement to a first PE, which then propagates the BGP advertisement among devices of a provider network (e.g., Provider Devices, "Ps," and/or other PEs) maintaining the transitive IGP attributes. A second PE sends the BGP advertisement to a second CE, along with the transitive IGP attributes. Upon receiving the BGP advertisement, the second CE converts the BGP advertisement and transitive IGP attributes into corresponding IGP advertisements. The second CE may then propagate the IGP advertisements into its customer network as either internal VPN routes or as external routes accordingly.

According to the illustrative embodiment described herein, new transitive extended community attributes are defined for transparently maintaining IGP attributes in BGP advertisements from the first CE to the second CE ("a CE-CE BGP advertisement"). Examples of such transitive extended community attributes include, inter alia, an IGP Domain Identifier (ID) attribute, an IGP Route Type attribute, an IGP Router ID attribute, and an IGP Metric attribute. Notably, the new transitive extended community attributes may be used to replace conventional non-transitive extended community attributes of a similar nature. Moreover, illustrative IGPs that may be used with the present invention include, e.g., the Open Shortest Path First (OSPF) or the Intermediate-System-to-Intermediate-System (IS-IS) protocols.

Advantageously, the novel technique maintains IGP transparency of VPN routes when BGP is used as a PE-CE protocol in a computer network. By configuring the CEs to function as VPN border routers, the novel technique allows for the use of CE-CE BGP advertisements with novel transitive IGP attributes. In particular, the present invention allows for the use of BGP on PE-CE links without losing IGP attributes within a VPN. Also, the present invention does not require PEs to communicate IGP advertisements with CEs (i.e., the PE is not required to be part of the customer's IGP cloud), and does not require any additional configuration of the PEs. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
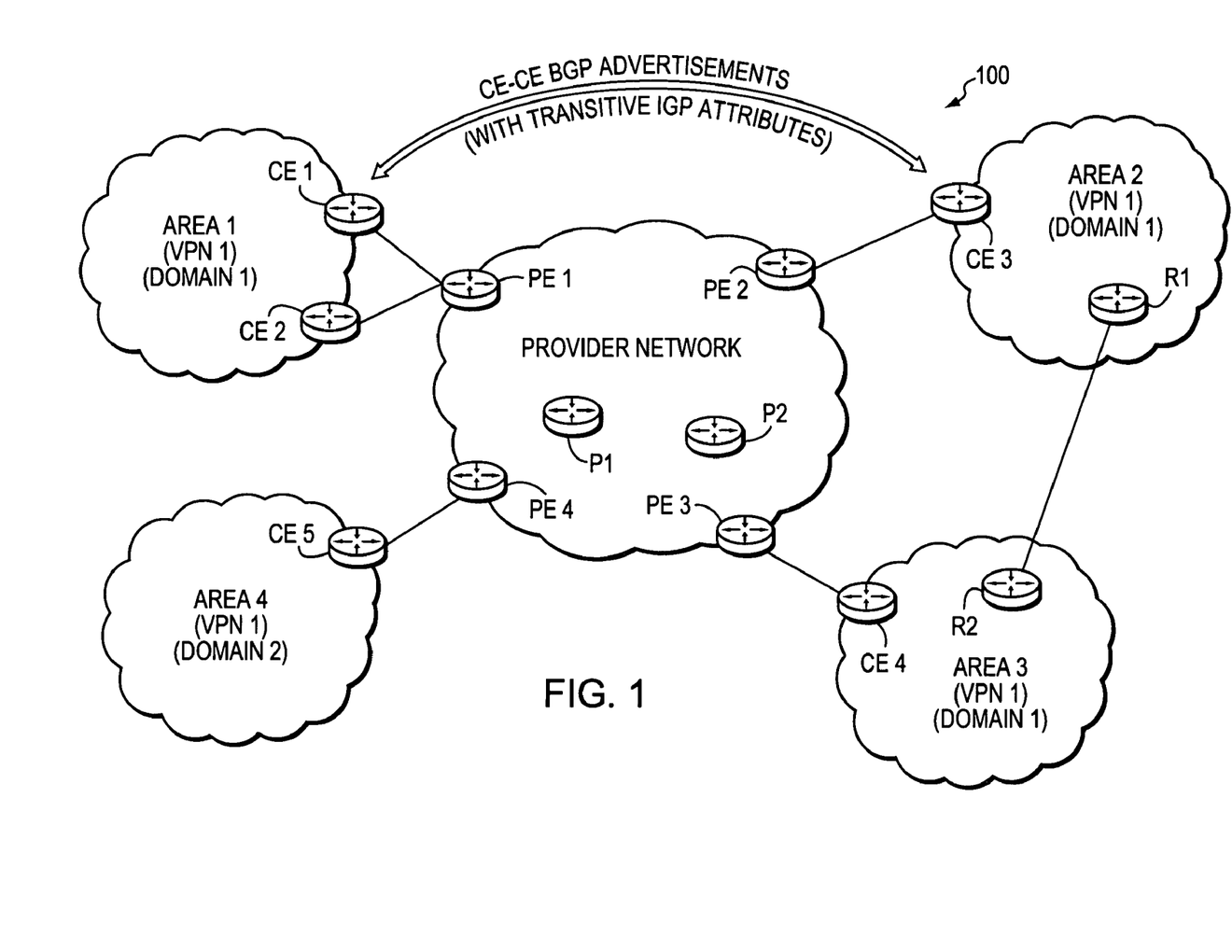
FIG. 1 is a schematic block diagram of an exemplary computer network that may be used in accordance with the present invention.

FIG. 1 is a schematic block diagram of an exemplary computer network 100 comprising a provider network, (e.g., a service provider network) interconnected to two or more customer networks, e.g., Areas 1-4. Although the provider and customer networks are described illustratively herein as autonomous systems, those skilled in the art will appreciate that they may be configured as one or more routing domains or other networks or subnetworks. The provider network comprises one or more network nodes, including a set of communicating border nodes or routers (illustratively, provider edge devices, or "PEs") PE1-PE4, through which client communications, such as data packet traffic, can pass into and out of the provider network. The provider network may also have zero or more intra-network nodes or routers (e.g., provider devices, or "Ps"), such as to form a "core" within the provider network (e.g., P1 and P2).

The customer networks also comprise one or more network nodes, including a set of communicating border nodes or routers (illustratively, customer edge devices, or "CEs"), through which client communications can pass into and out of the customer network. For instance, Area 1 may have CE1 and CE2 connected over PE-CE links to PE1 (over links CE1-PE1 and CE2-PE1, respectively), Area 2 may have CE3 connected to PE2 (over link CE3-PE2), Area 3 may have CE4 connected to PE3 (over link CE4-PE3), and Area 4 may have CE5 connected to PE4 (over link CE5-PE4). Notably, communication over the PE-CE links is in accordance with a PE-CE protocol. Moreover, the links may also be represented as PE1-CE1, PE2-CE3, etc., and the order of the link end nodes is equally interchangeable herein. Each customer network may also have zero or more intra-network nodes or routers, shown or not shown, such as, e.g., R1 in Area 2 and R2 in Area 3. Also, the intra-network routers within a customer network may be connected to an intra-network router within another customer network as a "backdoor" configuration, as will be understood by those skilled in the art (e.g., over link R1-R2 as shown).

The PEs and CEs may be configured as connections to/from one or more virtual private networks (VPNs), as will be understood by those skilled in the art. For instance, customer networks Areas 1-4 may belong to the same VPN, e.g., "VPN 1." Also, each customer network is associated with a particular domain, e.g., Areas 1-3 with "Domain 1" and Area 4 with "Domain 2," such as particular autonomous systems. These examples are merely representative. Those skilled in the art will understand that any number of routers, nodes, links, provider/customer networks, VPNs, domains, etc., may be used in the computer network 100 and connected in a variety of ways, and that the view shown herein is for simplicity.

Data packets may be communicated by the provider and customer networks using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a provider or customer network may rely on predetermined "interior" gateway protocols (IGPs), such as conventional link-state or distance-vector protocols. In addition, data packets containing network topology information may be exchanged among provider and customer networks using "external" gateway protocols, such as the Border Gateway Protocol (BGP), e.g., as described below. Those skilled in the art will understand that other communication protocols may be used within and among the networks, and that those mentioned above are merely representative.

Figure 2:
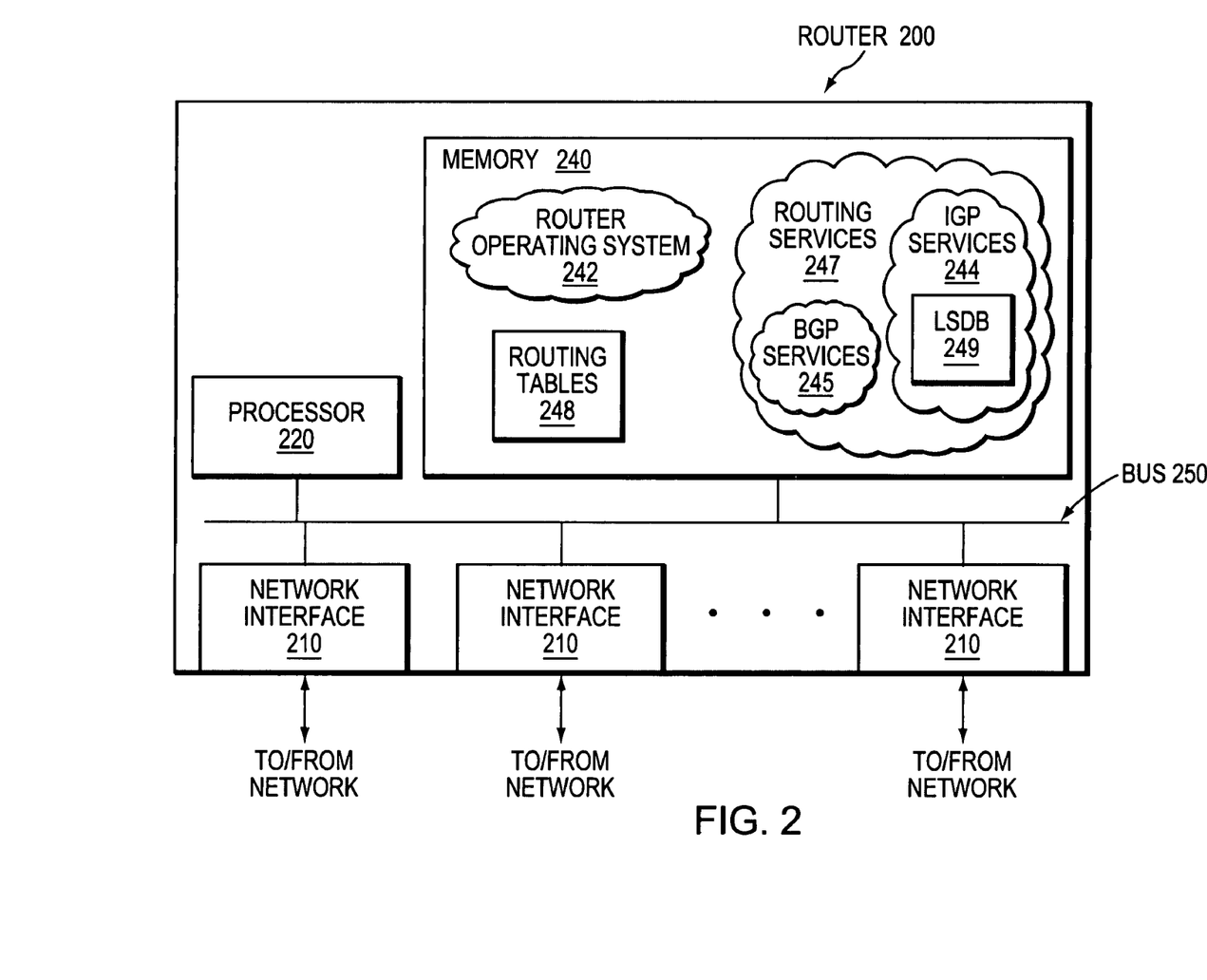
FIG. 2 is schematic block diagram of an exemplary router that may be advantageously used with the present invention.

FIG. 2 is a schematic block diagram of an exemplary node/ router 200 that may be advantageously used with the present invention, such as, e.g., a CE. The node comprises a plurality of network interfaces 210 (e.g., line cards), a processor 220, and a memory 240 interconnected by a system bus 250. The network interfaces 210 contain the mechanical, electrical and signaling circuitry for communicating data over physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing tables 248, or link state database (LSDB) 249. A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include routing services 247, IGP services 244, and BGP services 245. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS) as IGP services 244, BGP as BGP services 245, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

Changes in the network topology within a customer network may be communicated among routers 200 using a link-state protocol, such as the conventional OSPF and IS-IS protocols. Suppose, for example, that a communication link fails within a network or a cost value associated with a network node changes. Once the change in the network's state is detected by one of the routers, the IGP services 244 of that router may flood an IGP advertisement communicating the change to the other routers in the network. In this manner, each of the routers eventually "converges" to an identical view of the network topology.

Figure 3:
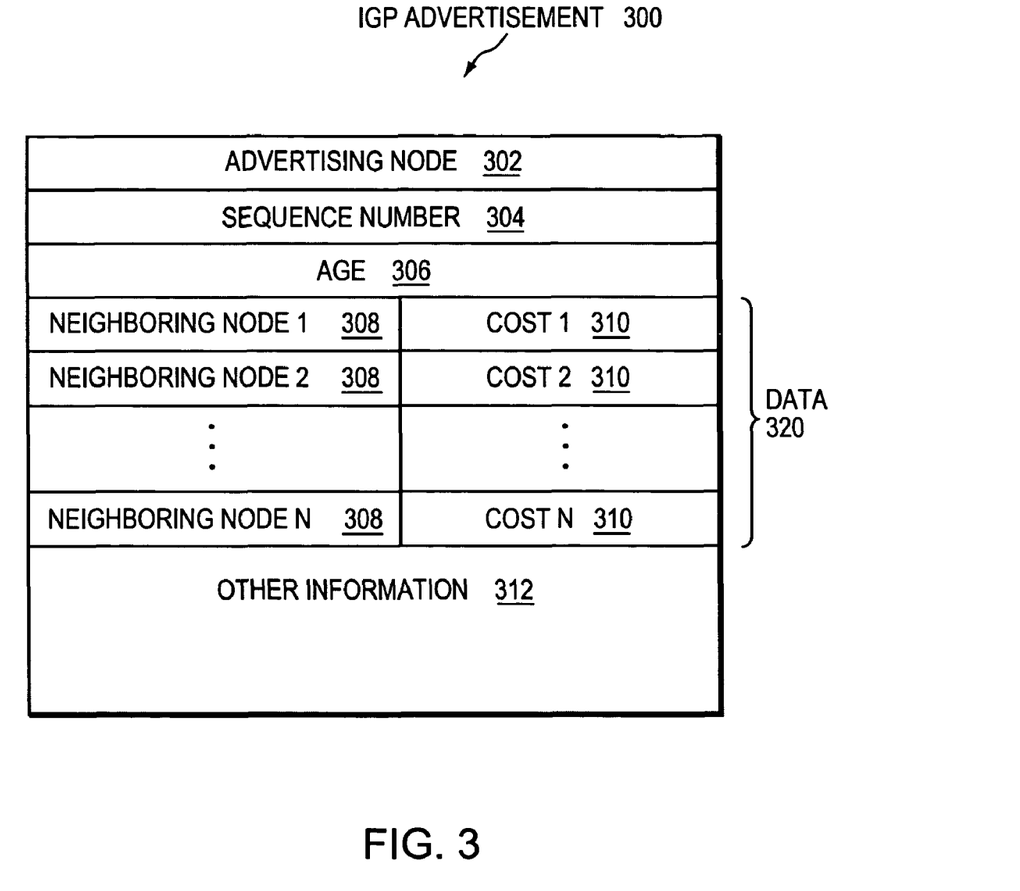
FIG. 3 is a schematic block diagram of an exemplary IGP advertisement that may be transmitted by the routers.

FIG. 3 illustrates an exemplary IGP advertisement 300 that may be flooded by the routers 200. The packet includes an advertising-node field 302, a sequence-number field 304, an age field 306, a data section 320, and other routing information 312. Notably, advertisement 300 is shown as an OSPF packet, but those skilled in the art will understand that other IGP packet formats may also be used in accordance with the present invention, e.g., IS-IS packets. The advertising-node field 302 stores a value that identifies the router that generated and originally broadcast the IGP advertisement 300. The sequence-number field 304 stores a sequence number indicating the relative version of the IGP advertisement. Typically, the sequence number stored in the field 304 is incremented, e.g., by one, for every new version of the IGP advertisement. The IGP advertisement 300 is therefore considered "stale" (invalid) if its sequence number is less than the sequence number stored in a previously-received version of the IGP advertisement, i.e., generated by the same advertising node. Accordingly, the routers 200 may be configured to store and forward only the most recent version of an IGP advertisement, e.g., the version having the largest sequence number.

The age field 306 also stores a value that may be used for determining whether the IGP advertisement 300 is valid. The age value is typically initialized to a non-zero integer value, often in units of seconds. The age value may be decremented, e.g., by one every second, until the age value reaches zero, thereby indicating that the IGP advertisement has become invalid. That is, every router 200 that stores or floods the IGP advertisement 300 continuously ages the packet until the age value equals zero. Those skilled in the art will appreciate that other aging mechanisms alternatively may be used, such as incrementing the IGP advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP advertisement 300, such as checksum values, packet-length information, flag values, type-of-service metrics, etc. Generally, the received IGP advertisements are stored in LSDB 249 of the router 200. Those skilled in the art will understand that different types of IGP advertisements may be used to convey different types of routes, such as, e.g., an OSPF type 3 IGP advertisement (internal/summary routes), an OSPF type 5 IGP advertisement (external routes), etc.

BGP services 245 may be used during communication of network reachability information among devices 200 between the customer and provider networks, such as through the transmission and analysis of BGP advertisements. Suppose, for example, that a new address prefix is established within a network (e.g., an AS) or a new connection is created between the provider network and/or the one or more customer networks. Once the change in the network's state is detected by one of the BGP enabled devices, that device may transmit a BGP advertisement communicating the change to the other networks (ASes). BGP services 245 of other network nodes receive the advertisements, update their internal routing/reachability information, and may continue to transmit BGP advertisements with the new information as understood by those skilled in the art.

Figure 4:
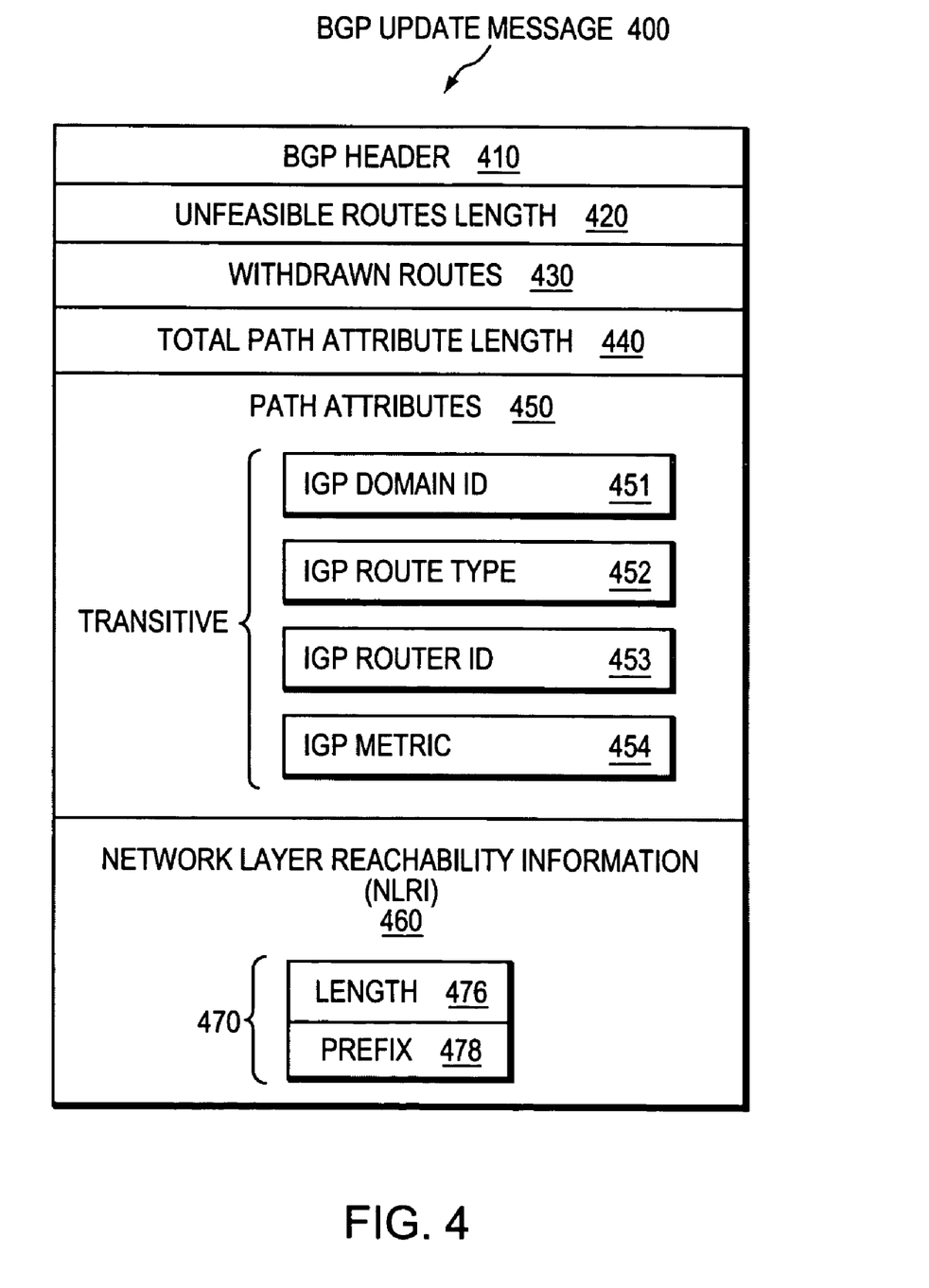
FIG. 4 is a schematic block diagram of an exemplary BGP advertisement that may be transmitted by the routers.

FIG. 4 illustrates an exemplary BGP advertisement 400 that may be transmitted by BGP enabled routers 200. Illustratively, the BGP advertisement 400 is a BGP update message. The packet includes a BGP header 410, unfeasible routes length field 420, withdrawn routes field 430, total path attribute length field 440, path attributes field 450, and network layer reachability information (NLRI) field 460. The BGP header 410 contains the type of BGP message (e.g., an update message), the overall length of the message, and other known information, such as predictable authentication data. The unfeasible routes length field 420 denotes the variable length of the withdrawn routes field 430, which contains a list of routes that are no longer used (or advertised) by the advertising BGP node. Notably, if the update message 400 only advertises feasible routes, the withdrawn routes field 430 need not be present.

The total path attribute length field 440 indicates the variable length of the path attributes field 450. Path attributes field 450 contains a sequence of optional path attributes, each attribute defining an attribute type, attribute length, and attribute value, such as, e.g., a multi-exit discrimination (MED) attribute (not shown). The MED attribute is a well-known optional non-transitive attribute that is generally used to discriminate among multiple exit or entry points to the same neighboring AS. Other attributes may be included within the Path attributes field 450, such as novel transitive IGP attributes in accordance with the present invention as described below.

The Network Layer Reachability Information (NLRI) field 460 contains a list of address prefixes, whose length is calculated using the overall length of the BGP message 400 contained within the BGP header 410. Reachability information in the NLRI field 460 comprises one or more encoded entries 470, each containing a length field 476, signifying the length of a prefix field 478. The prefix field 478 contains destination address prefixes that are reachable via, e.g., the originating (advertising) node, as described herein. Notably, a prefix 478 of zero length indicates a prefix that matches all destination addresses. In general, BGP update message 400 can advertise at most one route to a set of destination prefixes, and all path attributes 450 must apply to the entire set of destination prefixes contained in the NLRI field 460.

The present invention is directed to a technique for maintaining IGP transparency of VPN routes when BGP is used as a PE-CE protocol in a computer network. According to the novel technique, a first CE generates a BGP advertisement to advertise one or more VPN routes of its customer network, the BGP advertisement having one or more transitive IGP attributes for the advertised routes. The first CE sends the BGP advertisement to a first PE, which then propagates the BGP advertisement among devices of a provider network (e.g., Ps and/or other PEs) maintaining the transitive IGP attributes. A second PE sends the BGP advertisement to a second CE, along with the transitive IGP attributes. Upon receiving the BGP advertisement, the second CE converts the BGP advertisement and transitive IGP attributes into corresponding IGP advertisements. The second CE may then propagate the IGP advertisements into its customer network as either internal VPN routes or as external routes accordingly.

In accordance with the present invention the first CE, e.g., CE1, maintains a current LSDB 249 and routing tables 248 for its IGP area (customer network), Area 1, as will be understood by those skilled in the art. Particularly, illustrative IGPs that may be used with the present invention at the customer networks include, e.g., the Open Shortest Path First (OSPF) or the Intermediate-System-to-Intermediate-System (IS-IS) protocols. Other IGPs may also be used in accordance with the present invention, as will be understood by those skilled in the art, such as, e.g., static routing, the Routing Information Protocol (RIP), or proprietary IGPs, e.g., the Enhanced Interior Gateway Routing Protocol (EIGRP) of Cisco Systems, Inc.

Because the PE-CE protocol is BGP, the first CE (CE1) generates a BGP advertisement 400 (e.g., external or exterior BGP, or "eBGP") to convey each internal route (VPN route) to the first PE, e.g., PE1. The BGP advertisement 400 illustratively comprises one or more transitive IGP attributes to convey internal IGP topology information and/or metrics from the first CE to the first PE through BGP. The transitive IGP attributes may be used to ensure that remote CEs (e.g., the second CE, CE3) receive the IGP attributes, particularly those remote CEs of the same IGP domain (e.g., Domain 1).

According to the illustrative embodiment described herein, new transitive extended community attributes are defined for transparently maintaining IGP attributes in BGP advertisements 400 from the first CE to the second CE (a "CE-CE BGP advertisement"). Examples of such transitive extended community attributes include, inter alia, an IGP Domain Identifier (ID) attribute 451, an IGP Route Type attribute 452, an IGP Router ID attribute 453, and an IGP Metric attribute 454. For instance, the Domain ID attribute 451 may convey an identifier of the CE's domain, such as an AS number or other representation (e.g., Domain 1). The Route Type attribute 452 may convey the type of route advertised (e.g., internal, external, etc.) as well as an Area number of the route (e.g., Area 1). Also, the Router ID attribute 453 may convey the router ID of the originating router, e.g., CE1, as will be understood by those skilled in the art. Further, the IGP Metric attribute 454 may convey IGP metrics associated with reaching a particular destination address prefix by the route advertised, such as a cost, number of hops, etc.

Notably, the new transitive extended community attributes may be used to replace conventional non-transitive extended community attributes of a similar nature, and are passed transparently between CEs by PEs and Ps. For instance, the above-incorporated Internet draft, entitled *OSPF as the Provider/Customer Edge Protocol for BGP/MPLS IP VPNs*, defines a plurality of non-transitive extended community attributes that may be used to convey IGP attributes into BGP advertisements 400, such as a Domain ID, Route Type, and Router ID attribute. Also, the above Internet draft includes a use of the non-transitive MED attribute to convey IGP metrics to the BGP advertisements 400. Again, these previously defined attributes are non-transitive, and, as such, may not be used properly when the PE-CE protocol is BGP, as explained above.

As will be understood by those skilled in the art, each BGP attribute and extended community attribute may be defined with a specific type value. Particularly, BGP extended community attributes are described further in RFC 4360, entitled *BGP Extended Communities Attribute*, dated February 2006 by Sangli et al., which publication is publicly available through the IETF and is hereby incorporated by reference in its entirety. For instance, the type values include a "transitive bit" to define whether the attribute is transitive (e.g., "1") or non-transitive (e.g., "0").

As defined in the above-incorporated Internet draft, entitled *OSPF as the Provider/Customer Edge Protocol for BGP/MPLS IP VPNs*, the Domain ID (e.g., type "8005"), the Route Type (e.g., type "8000"), and the Router ID attribute (e.g., type "8001") each contain a non-transitive ("0") bit. In accordance with the present invention, each of the corresponding novel transitive IGP attributes may illustratively utilize the same type values with a transitive ("1") bit, e.g., the Domain ID (e.g., type "C005"), the Route Type (e.g., type "C000"), and the Router ID attribute (e.g., type "C001"). The novel transitive IGP metric attribute, which may replace the non-transitive use of the MED attribute, may utilize any transitive type value, e.g., "C002." Notably, the Internet Assigned Numbers Authority (IANA) may maintain a list of accepted (and registered) type values for BGP extended community attributes, to ensure that compatibility exists between the numerous devices in the network (e.g., different proprietary devices). As such, the above values are merely exemplary (e.g., experimental), and those skilled in the art will understand that other type values may be used in accordance with the present invention.

As mentioned above, the new transitive IGP attributes are passed transparently between CEs by PEs and Ps. For example, the service provider may utilize an interior BGP (iBGP) or a multi-protocol BGP (MP-BGP) to propagate the BGP advertisement 400 throughout the provider network. (Those skilled in the art will understand that "propagating," "sending," and/or "forwarding" advertisements as used herein may more specifically comprise receiving an advertisement, storing the contents of the advertisement, creating a new advertisement based on the stored contents, and forwarding a new advertisement.) Eventually, the second PE (e.g., PE2) receives the propagated BGP advertisement 400 with the transitive IGP attributes 451-454 contained therein. The second PE, as conventionally configured, forwards the BGP advertisement 400 to any attached CEs of the same VPN of the originating CE (e.g., VPN 1). Notably, the BGP advertisement 400 may contain a conventional MP-BGP field to indicate the VPN to which the advertisement should be propagated (e.g., route distinguishers and/or route targets). Accordingly, the PEs forward the advertisement 400 and any transitive attributes to those CEs that are members of the same VPN, for example, according to virtual routing/forwarding (VRF) instances, as will be understood. Those skilled in the art will appreciate that the techniques described herein for use with the present invention, therefore, require no changes or upgrades to the conventional operation of a PE.

In accordance with the present invention, when the second CE (e.g., CE3) receives the BGP advertisement 400, the second CE may first determine whether any IGP attributes are included within the path attributes field. If not, the BGP advertisement is a conventional BGP advertisement, and the second CE redistributes the advertised route as an external route accordingly. If transitive IGP attributes have been included, however, the second CE determines whether a Domain ID attribute 451 matches the second CE's domain ID (e.g., Domain 1). In particular, the second CE is configured to determine that BGP advertisements 400 that contain a matching Domain ID have been originated by another area with the same Domain ID. In this instance, the second CE examines the contents of the Route Type field 452 of the advertisement 400 to determine whether the routes are being advertised by the first CE as internal routes (e.g., Type 1, 2, or 3) or external routes (e.g., Type 5 or 7). Otherwise, i.e., if the Domain IDs do not match, the second CE determines that the routes are external. For instance, if the BGP advertisement 400 had originated at CE5 of Area 4, the Domain ID "2" would not have been a match, and the routes would be external to Domain ID "1."

Upon determining whether the VPN routes are internal or external routes, the second CE may correspondingly generate an IGP advertisement 300 for its customer network/area that indicates whether the advertised routes are internal (e.g., an OSPF summary/internal route advertisement, Type-3) or external (e.g., an OSPF external route advertisement, Type-5 or Type 7, depending on the type of area to which the second CE is attached). The present invention thus avoids improperly advertising internal routes as external routes based on the transitive IGP Domain ID attribute 451.

Notably, as those skilled in the art will understand, an "administrative distance" of the BGP advertised VPN routes (e.g., a preference weight value) may be less than the IGP route to reach a particular destination address prefix. As a result, the second CE receiving the BGP advertisements 400 will "prefer" the BGP route to the address prefix over the IGP route. There are situations, however, where this characteristic is undesirable. For instance, a backdoor link may be used for inter-area communication (e.g., R1-R2 between Area 2 and Area 3), in which case routes through the backdoor may not be advertised. More particularly, where a customer network is multi-homed to the provider network (e.g., CE1 and CE2 of Area 1), should a BGP route originated at CE1 for Area 1 and received at CE2 be preferred over the IGP route from within Area 1, the BGP route may be advertised back into Area 1 as a preferred route. Those skilled in the art will understand how problematic both situations may be. In response, the present invention may increase the administrative distance of the BGP instance on the CEs (or at least those acting as VPN border routers in accordance with the present invention) to a value that would generally not be preferred over an IGP route (e.g., "200"). Moreover, other conventional mechanisms when BGP is used as a PE-CE protocol may remain operational, such as, e.g., a DN bit, VPN route tags, Sham links (e.g., for backdoor applications), etc., as will be understood by those skilled in the art.

Figure 5:
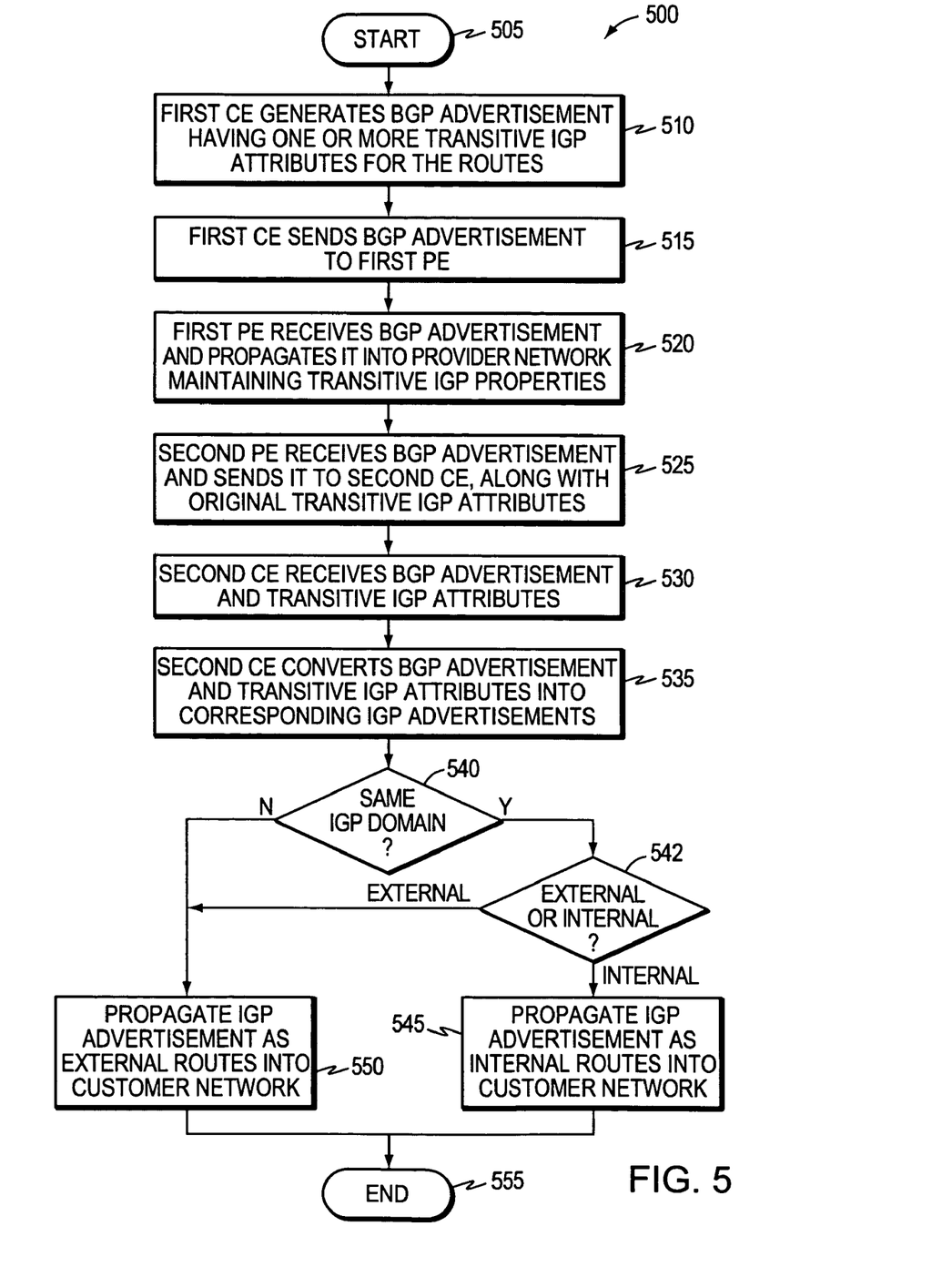
FIG. 5 is a flowchart illustrating a procedure for maintaining IGP transparency of VPN routes when BGP is used as a PE-CE protocol in accordance with the present invention.

FIG. 5 is a flowchart illustrating a procedure for maintaining IGP transparency of VPN routes when BGP is used as a PE-CE protocol in accordance with the present invention. The procedure 500 starts at step 505, and continues to step 510, where a first CE (e.g., CE1) generates a BGP advertisement 400 having one or more transitive IGP attributes (e.g., 451-454) contained therein. As described above, example transitive IGP attributes include, e.g., Domain ID 451, Route Type 452, Router ID 453, IGP metric 454, etc., each of which may be determined by the first CE through its local configuration and/or LSDB 249 for its customer network/area (e.g., Area 1).

Once generated, the first CE (CE1) sends the BGP advertisement 400 to a first PE of an attached provider network (e.g., PE1) in step 515. In step 520, the first PE receives the BGP advertisement 400 and propagates it into the provider network (e.g., to P1, P2, etc.), and each device of the provider network maintains the transitive IGP attributes while forwarding the advertisement.

A second PE (e.g., PE2) receives the BGP advertisement 400 in step 525, and sends it to a second CE (e.g., CE3) along with the original transitive IGP attributes sent from the first CE (CE1). Once the second CE receives the BGP advertisement 400 in step 530, the second CE may then convert the BGP advertisement 400 and transitive IGP attributes into corresponding IGP advertisements 300 (e.g., LSAs) in step 535 for its customer network/area (e.g., Area 2). In step 540, the second CE determines whether the Domain ID 451 of the incoming BGP advertisement 400 indicates that the routes advertised are from the same IGP domain (e.g., Domain 1). Where the routes are advertised from the same IGP domain, the second CE determines, e.g., from the Route Type attribute 452, whether the routes were originally advertised as internal or external routes in step 542. If the routes are internal, the second CE propagates the IGP advertisement 300 as an internal route advertisement (e.g., a type-3 LSA) into its customer network/area in step 545. Otherwise, e.g., where the BGP advertisement 400 is a conventional BGP advertisement 400 (routes from other domains or otherwise), or where the advertisement 400 is an external route advertisement from the same IGP domain, the second CE propagates the IGP advertisement 300 as an external route advertisement (e.g., a type-5 or type-7 LSA) in step 550. The sequence 500 ends at step 555, with proper internal/external route installation between two customer networks (i.e., with maintained IGP transparency through BGP advertisements).

It should be noted, that in accordance with the present invention, there may be situations where the first CE and PE (CE1-PE1) are configured with BGP as the PE-CE protocol, while the second PE and CE (PE2-CE3) may be configured with an IGP (e.g., OSPF) as the PE-CE protocol. In response, the second PE may be configured to redistribute internal or external routes to the second CE in a conventional manner, but using the transitive IGP attributes as in the present invention. However, in the event the second PE does not understand the transitive IGP attributes, the routes may all be advertised as external routes. To avoid this, the first PE (PE1) may be configured to add conventional non-transitive IGP attributes to the BGP advertisements 400, in addition to the transitive IGP attributes of the present invention received from the first CE. This way, the second PE, if not configured for the new transitive attributes, may distribute (using the IGP) internal or external routes according to conventional techniques.

There may also be situations where the first CE and PE (CE1-PE1) are configured with IGP (e.g., OSPF) as the PE-CE protocol, while the second PE and CE (PE2-CE3) may be configured with BGP as the PE-CE protocol (i.e., an opposite arrangement from above). In this case, if the first PE is not configured to generate transitive IGP attributes in accordance with the present invention, the first PE generates conventional non-transitive IGP attributes. The second PE would then receive the non-transitive attributes, and remove them from the forwarded BGP advertisement to the second CE, thus all being advertised as external routes. To avoid this, the second PE (PE2) may be configured to "translate" the received non-transitive IGP attributes into transitive IGP attributes in accordance with the present invention. Those skilled in the art will understand that once the above situations no longer exist (e.g., after a complete network upgrade), the PE configuration may be removed, and the route advertisements may continue in accordance with the present invention as described above.

Advantageously, the novel technique maintains IGP transparency of VPN routes when BGP is used as a PE-CE protocol in a computer network. By configuring the CEs to function as VPN border routers, the novel technique allows for the use of CE-CE BGP advertisements with novel transitive IGP attributes. In particular, the present invention allows for the use of BGP on PE-CE links without losing IGP attributes within a VPN. Also, the present invention does not require PEs to communicate IGP advertisements with CEs (i.e., the PE is not required to be in the CE's IGP backbone), and does not require any additional configuration of the PEs. Further, the dynamic nature of the novel technique alleviates the need for cumbersome manual configuration.

While there has been shown and described an illustrative embodiment that maintains IGP transparency of VPN routes when BGP is used as a PE-CE protocol in a computer network, it is to be understood that various other adaptations and modifications may be made within the spirit and scope of the present invention. For example, the invention has been shown and described herein using particular transitive IGP attributes. However, the invention in its broader sense is not so limited, and may, in fact, be used with any IGP attributes that may be advertised in a transitive manner. Moreover, while the above description describes performing the technique with a PE-CE protocol between a CE and a single provider network, the invention may also be advantageously used with multiple service provider networks. For instance, a PE of a first provider network may send a BGP advertisement 400 to a PE of a second provider network, which may be connected to the second CE. The transitive IGP attributes, therefore, will remain transparent through both provider networks accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for maintaining Interior Gateway Protocol (IGP) transparency of Virtual Private Network (VPN) routes when Border Gateway Protocol (BGP) is used as a Provider Edge Device (PE) to Customer Edge Device (CE) protocol, the method comprising:

generating a BGP advertisement at a first CE to advertise one or more internal VPN routes from the first CE to a second CE, wherein the first and second CEs are in the same customer network, the BGP advertisement having one or more transitive attributes that carry IGP path attributes for the advertised routes;

sending the BGP advertisement from the first CE to a first PE;

propagating the BGP advertisement from the first PE among devices of a provider network while maintaining the transitive attributes that carry IGP path attributes, one of the devices being a second PE;

sending the BGP advertisement from the second PE to a second CE, along with the transitive attributes that carry IGP path attributes;

receiving, at the second CE the BGP advertisement of VPN routes of the same customer network via the second PE; and in response, converting the BGP advertisement and transitive attributes that carry IGP path attributes at the second CE into corresponding IGP advertisements of the one or more internal VPN routes, wherein the method further comprises increasing an administrative distance of a BGP instance on the first CE within the BGP advertisement to persuade the second CE to select routes internal to the customer network rather than received routes from the BGP advertisement of the customer network.

2. The method as in claim 1, further comprising:
propagating the IGP advertisements from the second CE into the customer network as internal routes.

3. The method as in claim 2, further comprising:
propagating the IGP advertisements as internal routes in response to the first and second CEs belonging to a same IGP domain, wherein the transitive attributes that carry IGP path attributes indicate that the advertised routes are internal routes.

4. The method as in claim 3, further comprising:
determining whether the first and second CEs belong to the same IGP domain based on an IGP Domain Identifier (ID) transitive IGP attribute.

5. The method as in claim 1, further comprising:
configuring the transitive attributes that carry IGP path attributes as one or more transitive attributes selected from a group comprising: an IGP Domain Identifier (ID) attribute; an IGP Route Type attribute; an IGP Router ID attribute; and an IGP Metric attribute.

6. The method as in claim 1, further comprising:
carrying the transitive attributes that carry IGP path attributes as one or more extended community attributes in the BGP advertisement.

7. The method as in claim 1, wherein the IGP is selected from a group comprising: an Open Shortest Path First (OSPF) protocol; an Intermediate-System-to-Intermediate-System (IS-IS) protocol; a Routing Information Protocol (RIP); and an Enhanced Interior Gateway Routing Protocol (EIGRP).

8. A method comprising:

generating a Border Gateway Protocol (BGP) advertisement at a first Customer Edge Device (CE) to advertise one or more Virtual Private Network (VPN) routes of a customer network of the first CE to a remote CE, the BGP advertisement having one or more transitive attributes that carry IGP path attributes for the advertised VPN routes;

increasing an administrative distance of a BGP instance on the first CE within the BGP advertisement to persuade the remote CE to select routes internal to a customer network rather than received routes from the BGP advertisement;

sending the BGP advertisements to the one or more Provider Edge Devices (PEs);

receiving BGP advertisements from the one or more PEs, the received BGP advertisements having one or more transitive attributes that carry IGP path attributes corresponding to one or more VPN routes of a customer network of a remote CE; and converting the received BGP advertisements and transitive attributes that carry IGP path attributes into corresponding IGP advertisements.

9. The method as in claim 8, further comprising:
propagating the IGP advertisements into the customer network of the second CE as internal routes.

10. The method as in claim 8, further comprising:
configuring the transitive attributes that carry IGP path attributes as one or more of: an IGP Domain Identifier (ID) attribute; an IGP Route Type attribute; an IGP Router ID attribute; and an IGP Metric attribute.

11. The method as in claim 8, further comprising:
arranging the transitive attributes that carry IGP path attributes as one or more extended community attributes in the BGP advertisement.

12. A system for maintaining Interior Gateway Protocol (IGP) transparency of Virtual Private Network (VPN) routes when Border Gateway Protocol (BGP) is used as a Provider Edge Device (PE) to Customer Edge Device (CE) protocol, the system comprising:
a first CE configured to generate a BGP advertisement to advertise one or more internal VPN routes, the BGP advertisement having one or more transitive attributes that carry IGP path attributes for the advertised routes;
a first PE configured to receive the BGP advertisement and to propagate the BGP advertisement into a provider network of the first PE maintaining the transitive attributes that carry IGP path attributes;
a second PE configured to receive the BGP advertisement and to send the BGP advertisement along with the transitive attributes that carry IGP path attributes; and
a second CE configured to receive the BGP advertisement from the second PE, the second CE further configured to convert the BGP advertisement and transitive attributes that carry IGP path attributes into corresponding IGP advertisements of the one or more internal VPN routes,
wherein the first CE and the second CE are in a same customer network, and
the first CE is further configured to increase an administrative distance of a BGP instance on the first CE within the BGP advertisement to persuade the second CE to select routes internal to the customer network.

13. The system as in claim 12, wherein the second CE is further configured to:
propagate the IGP advertisements into a customer network of the second CE as internal routes.

14. The system as in claim 13, wherein the second CE is further configured to:
propagate the IGP advertisements as internal routes in response to the first and second CEs belonging to a same IGP domain, wherein the transitive attributes that carry IGP path attributes indicate that the advertised routes are internal routes.

15. A Customer Edge Device (CE) for use with maintaining Interior Gateway Protocol (IGP) transparency of Virtual Private Network (VPN) routes when Border Gateway Protocol (BGP) is used as a Provider Edge Device (PE) to CE protocol, the CE comprising:
one or more network interfaces configured send and receive BGP advertisements with one or more PEs;
a processor coupled to the one or more network interfaces and adapted to execute software processes; and
a memory adapted to store a routing process executable by the processor, the routing process configured to: i) generate BGP advertisements to advertise one or more internal VPN routes of a customer network of the CE, the BGP advertisements having one or more transitive attributes that carry IGP path attributes for the advertised routes, ii) increase an administrative distance of a BGP instance on the CE within the BGP advertisement, iii) send BGP advertisements to the one or more PEs, iv) receive BGP advertisements from the one or more PEs, the received BGP advertisements having one or more transitive attributes that carry IGP path attributes corresponding to one or more internal VPN routes of a customer network of a remote CE, and v) convert received BGP advertisements and transitive attributes that carry IGP path attributes into corresponding IGP advertisements of one or more internal VPN routes.

16. The CE as in claim 15, wherein the routing process is further configured to:
propagate the IGP advertisements into the customer network of the CE as internal routes.

17. The CE as in claim 16, wherein the routing process is further configured to:
propagate the IGP advertisements as internal routes in response to the first and second CEs belonging to a same IGP domain, wherein the transitive attributes that carry IGP path attributes indicate that the advertised routes are internal routes.

\* \* \* \* \*